United States Patent
Kim et al.

(10) Patent No.: US 10,324,555 B2
(45) Date of Patent: *Jun. 18, 2019

(54) DISPLAY DEVICE HAVING FORCE SENSOR STRUCTURE

(71) Applicant: LG Display Co., Ltd., Seoul (KR)

(72) Inventors: JuHan Kim, Bucheon-si (KR); YongChan Park, Seoul (KR); JinSeong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 120 days.

This patent is subject to a terminal disclaimer.

(21) Appl. No.: 15/391,630

(22) Filed: Dec. 27, 2016

(65) Prior Publication Data

US 2017/0192579 A1    Jul. 6, 2017

(30) Foreign Application Priority Data

Dec. 30, 2015 (KR) .................. 10-2015-0190100

(51) Int. Cl.
*G06F 3/041* (2006.01)
*G06F 3/044* (2006.01)

(52) U.S. Cl.
CPC .......... *G06F 3/0414* (2013.01); *G06F 3/044* (2013.01); *G06F 3/0416* (2013.01); *G06F 2203/04102* (2013.01); *G06F 2203/04106* (2013.01)

(58) Field of Classification Search
CPC ...... G06F 3/0414; G06F 3/0416; G06F 3/044; G06F 2203/04102; G06F 2203/04106
See application file for complete search history.

(56) References Cited

U.S. PATENT DOCUMENTS

| | | | | |
|---|---|---|---|---|
| 8,330,734 B2* | 12/2012 | Oohira | ............. | G02F 1/133308 345/173 |
| 9,851,269 B2* | 12/2017 | Ibrocevic | ............. | G01L 5/0076 |
| 9,983,752 B2* | 5/2018 | Shih | ............. | G06F 3/0412 |
| 2010/0156532 A1* | 6/2010 | Wang | ............. | H03F 1/307 330/253 |
| 2011/0157132 A1* | 6/2011 | Byun | ............. | G09G 3/3677 345/211 |
| 2011/0228473 A1* | 9/2011 | Anderson | ............. | G02B 6/4452 361/679.58 |
| 2012/0249444 A1* | 10/2012 | Lee | ............. | G06F 3/0412 345/173 |
| 2013/0342478 A1* | 12/2013 | Bae | ............. | G06F 3/041 345/173 |
| 2014/0132534 A1* | 5/2014 | Kim | ............. | G06F 3/0412 345/173 |
| 2015/0109548 A1* | 4/2015 | Kim | ............. | G02F 1/13338 349/12 |
| 2016/0034087 A1* | 2/2016 | Kim | ............. | G06F 3/044 345/173 |
| 2016/0172623 A1* | 6/2016 | Lee | ............. | H01L 51/5253 257/40 |
| 2016/0195972 A1* | 7/2016 | Chen | ............. | G02F 1/13338 345/173 |

(Continued)

*Primary Examiner* — Ricardo Osorio
(74) *Attorney, Agent, or Firm* — Fenwick & West LLP

(57) ABSTRACT

Embodiments of the present invention relate to a display device having a force sensor structure and, more specifically, to a display device having a force sensor structure which, when a user's touch occurs, senses not only touch coordinates but also the user's touch force for pressing a screen, in order to provide various functions in various forms.

15 Claims, 21 Drawing Sheets

(56) References Cited

U.S. PATENT DOCUMENTS

2016/0274724 A1* 9/2016 Chang .................. G06F 3/0416
2017/0068376 A1* 3/2017 Kim ..................... G06F 3/0416
2017/0068377 A1* 3/2017 Kim ..................... G06F 3/0416
2017/0068384 A1* 3/2017 Kim ..................... G06F 3/0416
2017/0220174 A1* 8/2017 Kim ..................... G06F 3/0414

* cited by examiner

DISPLAY DEVICE HAVING FORCE SENSOR STRUCTURE

CROSS-REFERENCE TO RELATED APPLICATIONS

This application claims priority under 35 U.S.C § 119(a) to Republic of Korea Patent Application No. 10-2015-0190100, filed on Dec. 30, 2015, which is hereby incorporated by reference for all purposes as if fully set forth herein.

BACKGROUND OF THE INVENTION

1. Field of the Invention

Embodiments of the present invention relate to a display device having a force sensor structure.

2. Description of the Prior Art

As the information society develops, a demand for a display device for displaying an image has increased in various forms, and various types of display devices have been used, such as a liquid crystal display device, a plasma display device, and an organic light-emitting liquid crystal in-cell touch type display.

In addition, among display devices, mobile devices, such as a smart phone and a tablet, and medium and large-sized devices, such as a smart television, process a touch type input according to user convenience and device characteristics.

Such a display device which can process a touch input has been developed to provide more various functions, and user demands have also been more diverse.

However, a currently applied touch input processing corresponds to a scheme of sensing only a touch position (touch coordinates) of a user and processing a related input at a sensed touch position. Therefore, there are limitations in the present situation in which many functions of various kinds are required to be provided in various forms and various user demands are required to be satisfied.

SUMMARY

In order to provide various functions in various forms, the purpose of embodiments of the present invention is to provide a display device having a force sensor structure which, when a user's touch occurs, senses not only touch coordinates but also the user's touch force for pressing a screen.

Another purpose of embodiments of the present invention is to provide a display device having a force sensor structure which can utilize a reference structure.

Embodiments of the present invention may provide a display device having a force sensor structure including: a plurality of first electrodes embedded in a display panel; at least one second electrode disposed outside the display panel; and a touch circuit which sequentially applies a first electrode driving signal to the plurality of first electrodes and applies a second electrode driving signal to the second electrode, so as to sense a touch force of a touch, during each touch driving section.

Such a display device having a force sensor structure may further include: a first flexible printed circuit electrically connected to a display panel; a second flexible printed circuit electrically connected to the first flexible printed circuit; and a connecting medium which electrically connects the second flexible printed circuit and the second electrode.

In this case, the first electrode driving signal may be sequentially applied to the plurality of first electrodes embedded in the display panel through the first flexible printed circuit. The second electrode driving signal may be applied to the second electrode disposed outside the display panel through the first flexible printed circuit, the second flexible printed circuit, and the connecting medium.

Such a display device having a force sensor structure may include a signal supply unit which outputs the first electrode driving signal to the first flexible printed circuit or outputs the first electrode driving signal and the second electrode driving signal to the first flexible printed circuit.

When such a signal supply unit outputs only the first electrode driving signal to the first flexible printed circuit, the display device having a force sensor structure may further include a level shifter which is disposed in the first flexible printed circuit and converts an amplitude of the first electrode driving signal to output a second electrode driving signal.

The display device having a force sensor structure may further include a backlight unit disposed under the display panel.

In this case, the second flexible printed circuit may be a light emitting diode (LED) flexible printed circuit which electrically connects the backlight unit and the first flexible printed circuit.

The backlight unit of the display device having a force sensor structure has a second electrode inserted therein or attached to the rear surface thereof.

That is, the backlight unit of the display device having a force sensor structure may be a backlight unit having a force sensor structure integrated therewith.

In order to provide various functions in various forms, some embodiments described above may provide a display device having a force sensor structure which, when a user's touch occurs, senses not only touch coordinates but also the user's touch force for pressing a screen.

In addition, some embodiments may provide a display device having a force sensor structure which can utilize a reference structure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
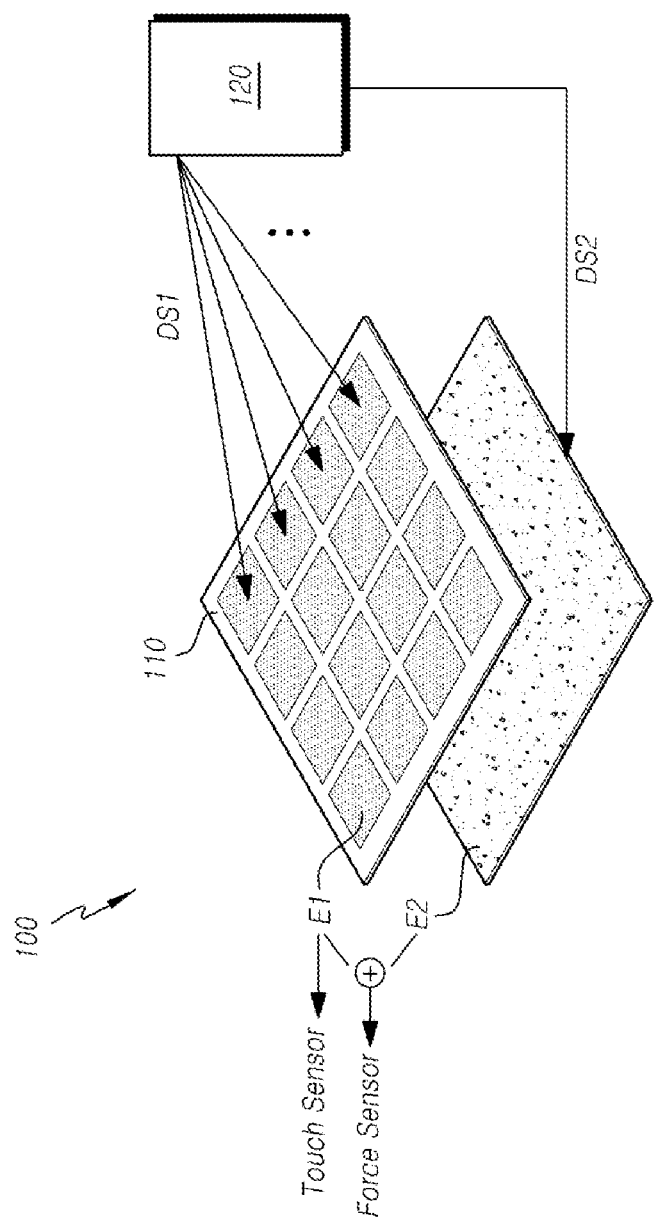
FIG. 1 schematically illustrates a touch system of a display device having a force sensor structure according to some embodiments.

Hereinafter, some embodiments will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 schematically illustrates a touch system 100 of a display device having a force sensor structure according to some embodiments.

Referring to FIG. 1, a display device having a force sensor structure according to some embodiments includes a touch system 100 for sensing a touch generated by a pointer, such as a finger and a pen.

The touch system 100 according to some embodiments may sense not only whether a touch is generated and coordinates of a touch but also a touch force corresponding to a force (pressure) applied at the time of touching.

A touch mentioned in the present specification refers to an action in which a user touches a display panel 110 with a pointer, and a touch force refers to a force (pressure) which presses the display panel 110 when a user touches the display panel. Further, touch coordinates refer to a position of a spot where a user touches the display panel 110.

In addition, a touch force mentioned in the present specification refers to a touch which has a force (pressure) of pressing the display panel 110 or has a force exceeding a certain level, and a soft touch mentioned in the present specification refers to a touch which has no force (pressure) of pressing the display panel 110 or has a force of a certain level or less.

In addition, in order to sense touch coordinates, a pointer should be a pointer, which contains a conductive material, such as a finger and a pen, or is formed of a conductive material. However, a pointer for sensing a touch force may be a pointer formed of a non-conductive material as well as a conductive material, and may be anything that can apply force.

Accordingly, the touch system 100 according to some embodiments may include: a plurality of first electrodes E1 required to obtain whether a touch is generated and to obtain coordinates of a touch; a second electrode E2 for sensing a touch force of a touch; a touch circuit 120 for driving the plurality of first electrodes E1 and the second electrode E2 to thereby sense whether a touch is generated and coordinates of a touch, and to sense a touch force of a touch.

The plurality of first electrodes E1 corresponding to a touch sensor required to obtain whether a touch is generated and to obtain coordinates of a touch may be arranged in a touch screen panel separate from the display panel 110, or may be embedded in the display panel 110.

Thus, when the plurality of first electrodes E1 is embedded in the display panel 110, the display panel 110 may be referred to as a "touch screen embedded display panel" embedding the plurality of first electrodes E1 which serves as a touch sensor.

A touch screen embedded in such a display panel 110 may be a touch screen panel in an in-cell or on-cell type.

Meanwhile, the second electrode E2 required to sense a touch force corresponding to a force (pressure) applied at the time of touching may be disposed outside (for example, under, above, on a side of, etc.) the display panel 110.

Meanwhile, in the touch system 100 according to some embodiments, both the driving of the plurality of first electrodes E1 for sensing whether a touch is generated and touch coordinates and the driving of the second electrode E2 for sensing a touch force of a touch may be progressed in the same driving process which is a touch driving.

In other words, during one touch driving section, the touch circuit 120 of the touch system 100 according to some embodiments may sequentially apply a first electrode driving signal DS1 to the plurality of first electrodes E1 and may apply a second electrode driving signal DS2 to the second electrode E2. That is, during one touch driving section, both the plurality of first electrodes E1 and the second electrode E2 are driven.

Accordingly, in the touch system 100 according to some embodiments, both the plurality of first electrodes E1 embedded in the display panel 110 and the second electrode E2 disposed outside the display panel 110 may be referred to as a "force sensor". Further, the plurality of first electrodes E1 embedded in the display panel 110 may be referred to as a "touch sensor" or a "touch electrode".

As described above, the touch system 100 according to some embodiments may progress a first electrode driving and a second electrode driving in the same touch driving process (touch driving section), and thus may perform a sensing of whether a touch is generated and touch coordinates and a sensing of a touch force in a shorter time, compared with separately progressing the first electrode driving and the second electrode driving through different driving processes (different touch driving sections).

Meanwhile, in the touch system 100 according to some embodiments, the touch circuit 120 may generate a second electrode driving signal DS2 on the basis of a first electrode driving signal DS1 in generating the second electrode driving signal DS2.

Accordingly, the second electrode driving signal DS2 is a signal corresponding to the first electrode driving signal DS1.

For example, the second electrode driving signal DS2 has the same phase as that of the first electrode driving signal DS1. The signal characteristics of the first electrode driving signal DS1 and the second electrode driving signal DS2 will be described later.

The touch circuit 120 may include various types of circuits in order to generate a second electrode driving signal DS2. For example, the touch circuit 120 may include a level shifter and, according to circumstances, may include a phase shifter.

Such a level shifter or a phase shifter may be used to easily and efficiently generate a second driving signal DS2 through a process of shifting a level of a generated first electrode driving signal DS1 or inverting a phase thereof, after a first electrode driving signal DS1 is generated, without separately and newly generating the second electrode driving signal DS2.

The touch driving section in which both the first electrode driving and the second electrode driving are performed may be progressed together with a display driving section for image display, or may be time-divided into touch driving section fragments, and the divided fragment progresses between every display driving section.

Hereinafter, a case where the display driving and the touch driving are respectively progressed in the time-divided display driving section and the touch driving section will be described with reference to FIG. 2.

Figure 2:
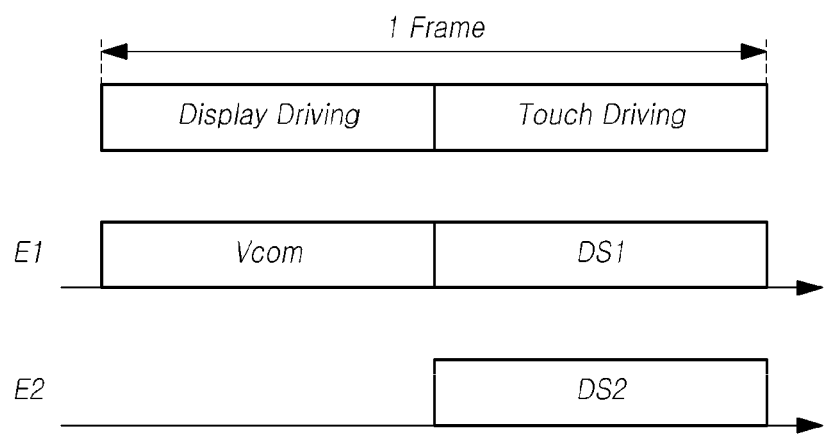
FIG. 2 illustrates a driving section of a display device having a force sensor structure according to some embodiments.

FIG. 2 illustrates a driving section of a display device having a force sensor structure according to some embodiments.

Referring to FIG. 2, a display device having a force sensor structure according to some embodiments, for example, may time-divide one frame section into a display driving section and a touch driving section.

During the touch driving section, the first electrode driving and the second electrode driving may be performed at the same time.

Accordingly, during the touch driving section, the first electrode driving signal DS1 may be sequentially applied to the plurality of first electrodes E1 and, at this time, the second electrode driving signal DS2 may be applied to the second electrode E2.

Meanwhile, the plurality of first electrodes E1 embedded in the display panel 110 may be a dedicated electrode for a touch sensing, or may be a display driving electrode required for a display driving.

For example, the plurality of first electrodes E1 embedded in the display panel 110 may be a common voltage electrode to which a common voltage (Vcom) is applied in a display driving section.

That is, the plurality of first electrodes E1 may receive all the common voltage applied thereto as a display driving voltage when the display driving and may sequentially receive the first electrode driving signal DS1 applied thereto during the touch driving.

As described above, since the plurality of first electrodes E1 are a common mode electrode which can also be used as a display driving electrode, there is no need to separately form electrodes for two purposes on the display panel 110. Accordingly, a panel design may become easier and a panel structure may be simplified.

Hereinafter, a structure for sensing touch coordinates and a touch force by the touch system 100 according to some embodiments and a touch driving method will be described in more detail.

Figure 3:
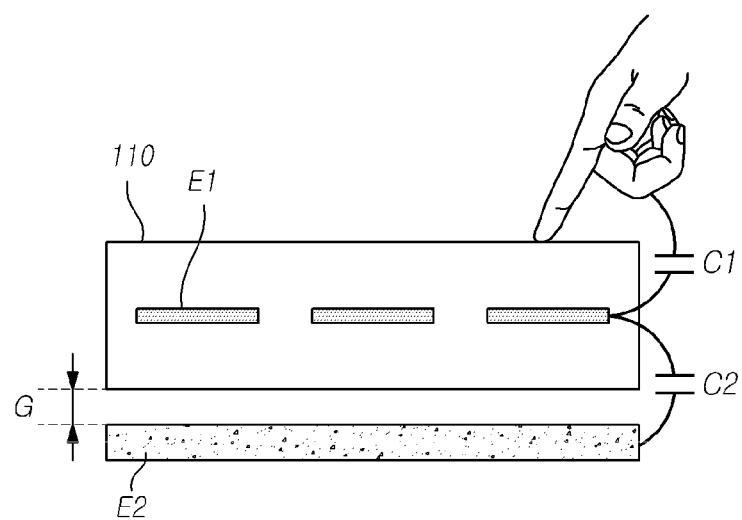
FIG. 3 illustrates a structure of a touch system according to some embodiments.

FIG. 3 schematically illustrates a structure of a touch system 100 according to some embodiments.

Referring to FIG. 3, in order to sense a touch force (pressing force) of a touch, the touch system 100 according to some embodiments does not separately utilize a dedicated pressure sensor for sensing pressure like a conventional pressure sensing scheme, but senses a touch force in a capacitance scheme by using both a second electrode E2 disposed outside a display panel 110 for sensing a touch force and a plurality of first electrodes E1 embedded in the display panel 110 for calculating touch coordinates.

That is, a touch force may be sensed by driving both the plurality of first electrodes E1 and the second electrodes E2. In this regard, a force sensor for sensing a touch force may include the plurality of first electrodes E1 and the second electrodes E2.

Referring to FIG. 3, during a touch driving section, when a first electrode driving signal DS1 is applied to any one of the first electrodes E1, and at this time, a second electrode driving signal DS2 is applied to the second electrode E2, a first capacitance C1 is formed between a pointer, such as a finger, and the first electrodes E1, and a second capacitance C2 is formed between the first electrodes E1 and the second electrode E2.

The touch circuit 120, for example, may calculate touch coordinates and sense a touch force on the basis of a change in the first capacitance C1 and the second capacitance C2.

Referring to FIG. 3, in order for a second capacitance C2 to be formed between the first electrodes E1 and the second electrode E2, a gap G should exist between the first electrodes E1 and the second electrode E2.

Here, the gap G may be a distance between the first electrodes E1 and the second electrode E2, a distance between a structure directly above the second electrode E2 and the second electrode E2, or a distance between a screen where a touch is generated and the second electrodes E2.

In order to sense a touch force, the size of a gap G existing between the first electrodes E1 and the second electrode E2 should be changed according to a touch force of a touch generated on an upper portion of the display panel 110.

A change in the size of the gap G may be different by each location. A change in the size of a gap for sensing a touch force between at the central position of the second electrode E2 and the plurality of first electrodes E1 may be larger than a change in the size of a gap for sensing a touch force between the edge of the second electrode E2 and the plurality of first electrodes E1.

This is caused by a structural feature for sensing a touch force and occurs when the edge portion of the second electrode E2 is bonded or coupled to a peripheral structure.

When a change in the size (displacement) of the gap G occurs according to a touch force, the second capacitance C2 between the first electrodes E1 and the second electrode E2 changes, and the touch force may be sensed on the basis of the amount of change in the second capacitance C2.

According to the above description, the touch force sensing may be performed by the same capacitance method as a sensing method of the touch position sensing (a touch coordinate sensing) for the other kinds of sensing. Therefore, two kinds of sensing (a touch position sensing, a touch force sensing) may be efficiently performed.

The gap G described above may exist at various positions between the plurality of first electrodes E1 and the second electrode E2 and, for example, may be an air gap or a dielectric gap.

When the type of the gap G existing between the plurality of first electrodes E1 and the second electrode E2 is changed, a structure should be formed so that a gap G corresponding thereto exists therebetween. This will be described in more detail later.

Figure 4:
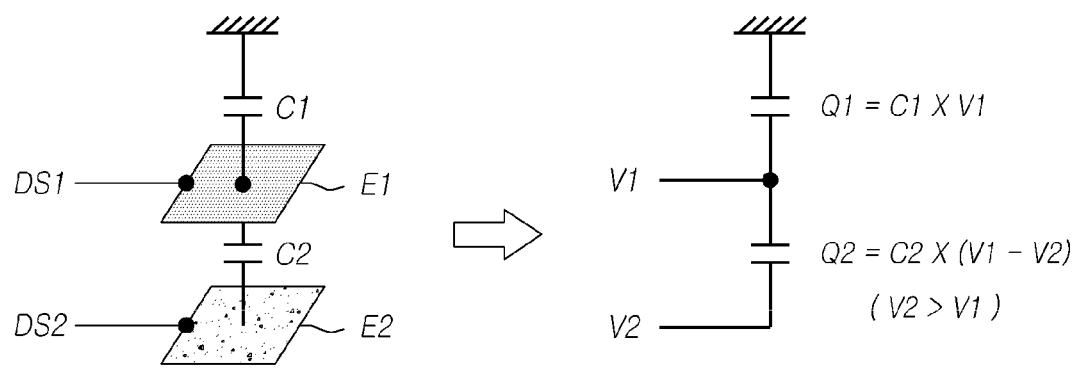
FIG. 4 illustrates a touch driving method according to some embodiments.

FIG. 4 illustrates a touch driving method according to some embodiments.

When a structure of the touch system 100 of FIG. 3 is schematically shown, it may be illustrated as shown in FIG. 4.

Referring to FIG. 4, during a touch driving section, when a first electrode driving signal DS1 is applied to one of first electrodes E1 and, at this time, a second electrode driving signal DS2 is applied to a second electrode E2, a first capacitance C1 is formed between a pointer, such as a finger, and the first electrode E1, and a second capacitance C2 is formed between the first electrode E1 and the second electrode E2.

During the touch driving, the amount of charge Q1 charged in a capacitor between the pointer and the first electrode E1 may be determined by voltage V1 of the first electrode driving signal DS1 and the first capacitance C1.

In addition, the amount of charge Q2 charged in a capacitor between the first electrode E1 and the second electrode E2 may be determined by the second capacitance C2, voltage V1 of the first electrode driving signal DS1, and voltage V2 of the second electrode driving signal DS2.

That is, during the touch driving, the amount of charge Q1 charged in the capacitor between the pointer and the first electrode E1 and the amount of charge Q2 charged in the capacitor between the first electrode E1 and the second electrode E2 may be expressed as Equation Set 1 below.

$$Q1 = C1 \times V1$$

$$Q2 = C2 \times (V1 - V2)$$ [Equation Set 1]

In the following description, two kinds of signals to be used at the time of touch driving described above (the first electrode driving and the second electrode driving), that is, the signal characteristics of the first electrode driving signal DS1 and the second electrode driving signal DS2 will be described.

Figure 5:
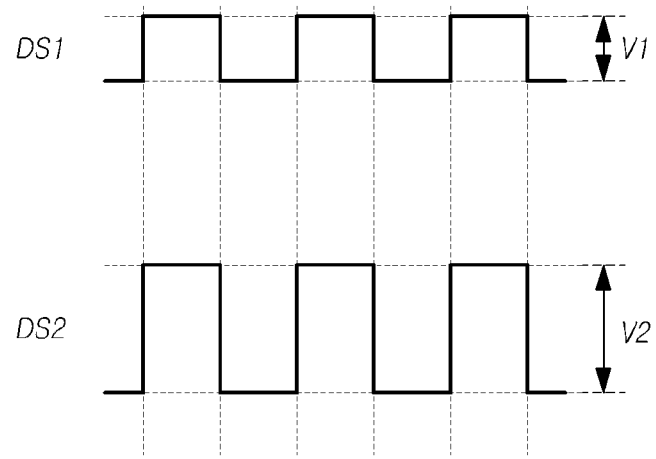
FIG. 5 is an exemplary diagram of a first electrode driving signal for driving a first electrode and a second driving signal for driving a second electrode, in a touch system according to some embodiments.
Figure 6:
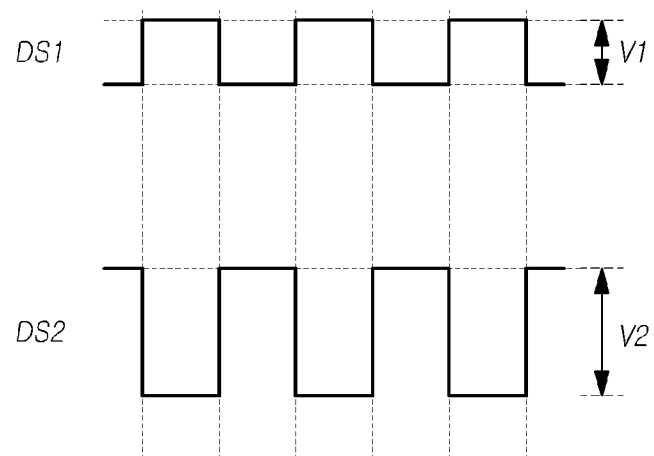
FIG. 6 is another exemplary diagram of a first electrode driving signal for driving a first electrode and a second driving signal for driving a second electrode, in a touch system according to some embodiments.

FIG. 5 is an exemplary diagram of a first electrode driving signal DS1 for driving a first electrode and a second driving signal DS2 for driving a second electrode in a touch system 100 according to some embodiments, and FIG. 6 is another exemplary diagram of a first electrode driving signal DS1 for driving a first electrode and a second electrode driving signal DS2 for driving a second electrode in a touch system according to some embodiments.

As shown in FIG. 5, the second electrode driving signal DS2 and the first electrode driving signal DS1 may have the same phase.

In this case, it can be said that the second electrode driving signal DS2 and the first electrode driving signal DS1 are in a normal phase (in-phase) relationship.

As described above, when the second electrode driving signal DS2 and the first electrode driving signal DS1 having the same phase are used, an efficient touch driving (the second electrode driving and the first electrode driving) and an efficient sensing (the touch force sensing and the touch coordinate sensing) may be possible. In addition, the second electrode driving signal DS2 and the first electrode driving signal DS1, which are two signals required for the touch driving, may be easily generated.

Meanwhile, referring to FIG. 5, the second electrode driving signal DS2 may have a greater signal intensity than the first electrode driving signal DS1. That is, the voltage V2 of the second electrode driving signal DS2 may be higher than the voltage V1 of the first electrode driving signal DS1.

As described above, when the voltage V2 of the second electrode driving signal DS2 is higher than the voltage V1 of the first electrode driving signal DS1, the amount of charge Q2 charged in the capacitor between the first electrode E1 and the second electrode E2 has a negative value.

In this regard, a signal received from the first electrode E1 is a signal corresponding to the amount of charge (Q1+Q2), which is the sum of the amount of charge Q1 charged in the capacitor between the pointer and the first electrode E1 and the amount of charge Q2 charged in the capacitor between the first electrode E1 and the second electrode E2. In this regard, since the amount of charge Q2 charged in the capacitor between the first electrode E1 and the second electrode E2 has a negative value, (Q1+Q2) becomes smaller than Q1, so that a signal received from the first electrode E1 is reduced.

Accordingly, in a case where the second electrode driving signal DS2 and the first electrode driving signal DS1 are in a normal phase relationship, when the voltage V2 of the second electrode driving signal DS2 is higher than the voltage V1 of the first electrode driving signal DS1, the signal intensity of the signal received from the first electrode E1 is represented by a negative value with respect to a baseline so that a soft touch which has no pressing force or has a force of a certain level or less may be accurately distinguished from a force touch which has a pressing force or has a force exceeding a certain level.

As shown in FIG. 6, the second electrode driving signal DS2 and the first electrode driving signal DS1 may have a 180 degree phase difference.

In this case, the second electrode driving signal DS2 and the first electrode driving signal DS1 are in a reverse phase relationship.

As described above, when the second electrode driving signal DS2 and the first electrode driving signal DS1 in a reverse phase relationship are used, a voltage difference between the voltage V1 of the first electrode driving signal DS1 and the voltage V2 of the electrode driving signal DS2 becomes a positive value. When a sensing method is implemented to be suitable for this case, using the second electrode driving signal DS2 and the first electrode driving signal DS1 in a reverse phase relationship may be effective.

Hereinafter, the above-described touch driving and an internal circuit configuration of the touch circuit 120 for sensing touch coordinates and a touch force through the touch driving will be described as an example.

Figure 7:
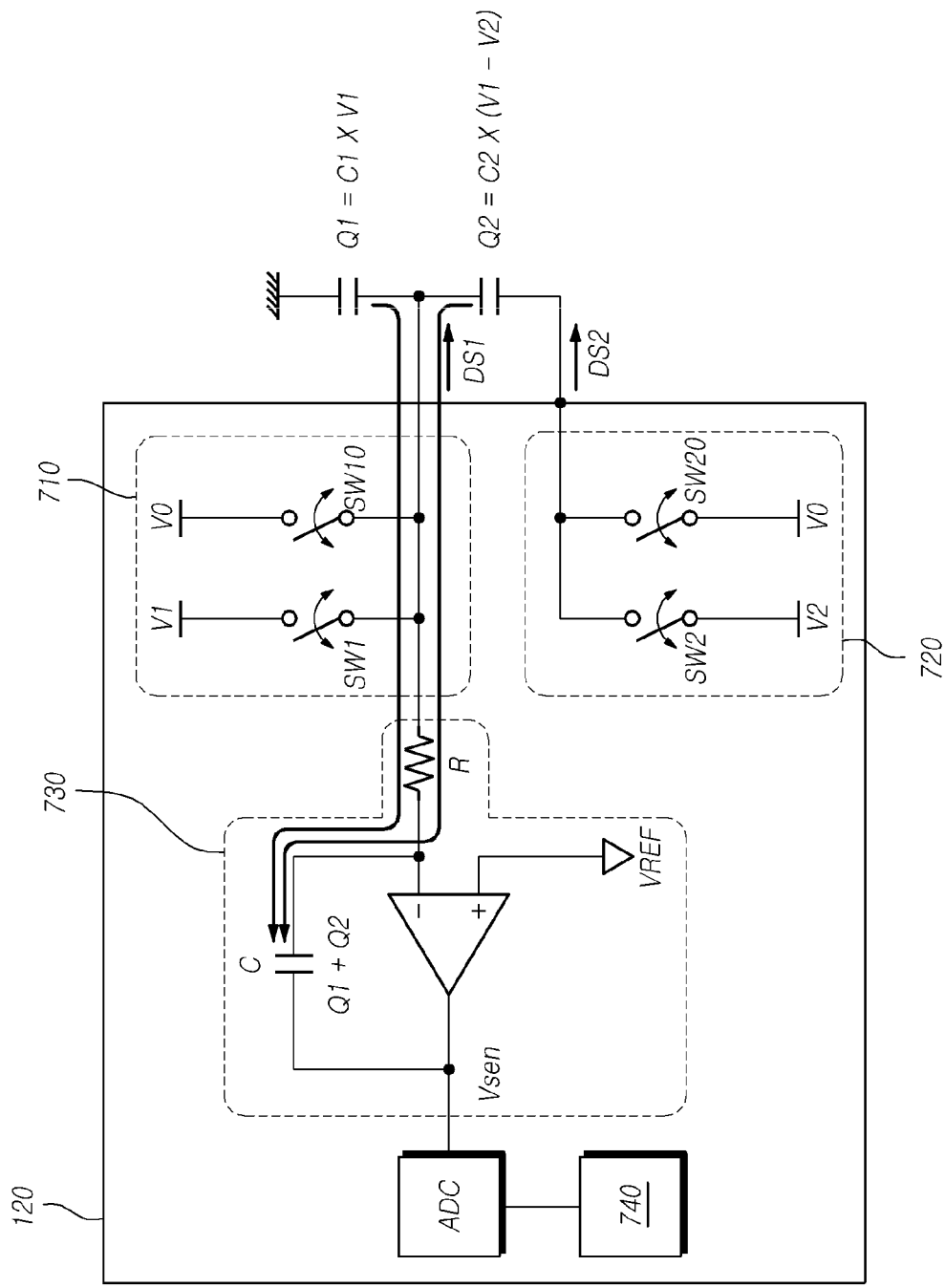
FIG. 7 is an exemplary diagram of a touch circuit according to some embodiments.

FIG. 7 is an exemplary diagram of a touch circuit 120 according to some embodiments.

As shown in FIG. 7, the touch circuit 120 may include: a first electrode driving signal supply unit 710 for supplying a modulation signal type first electrode driving signal DS1 having a high level of V1 voltage and a low level of V0 voltage through an on-off control by two switches SW1 and SW10; a second electrode driving signal supply unit 720 for supplying a modulation signal type second electrode driving single DS2 having a high level of V2 voltage and a low level of V0 voltage through an on-off control by two switches SW2 and SW20; an integrator 730 for outputting an integral value with respect to an input, the integrator including an operational amplifier OP-AMP, a capacitor C, and a resistor R; an analog-to-digital converter (ADC) for converting an output value from the integrator 730 into a digital value; and a processor 740 for performing a touch coordinate calculation and a touch force recognition, on the basis of the digital value output from the analog-to-digital converter (ADC).

Here, at least one of the analog-to-digital converter (ADC) and the processor 740 may be external to the touch circuit 120.

The circuit configuration of the touch circuit 120 shown in FIG. 7 may be merely an example for convenience of description, but may be implemented in various forms.

Referring to FIG. 7, during the touch driving, the touch circuit 120 may sequentially apply a first electrode driving signal DS1 to a plurality of first electrodes E1, may apply a second electrode driving signal DS2 to a second electrode E2, and may sense a charged amount (or voltage) according to a change in the size of a gap G between the plurality of first electrodes E1 and the second electrode E2 on the basis of a signal (an input of the integrator 730) received from each of the plurality of first electrodes E1, so as to recognize a touch force of a touch.

Referring to FIG. 7, when a pointer is made of a non-conductive material, the touch circuit 120 may sense only a touch force on the basis of a signal received from each of the plurality of first electrodes E1. However, when a pointer is made of a conductive material, the touch circuit 120 may further calculate coordinates of a touch on the basis of a signal (an input of the integrator 730) received from each of the plurality of first electrodes E1.

Referring to FIG. 7, a signal (an input of the integrator 730) received from each of the plurality of first electrodes E1 corresponds to the total amount of charges (Q1+Q2) in which the amount of charge Q1 charged in the capacitor between the pointer and the first electrode E1 and the amount of charge Q2 charged in the capacitor between the first electrode E1 and the second electrode E2 are summed.

The total amount of charge (Q1+Q2) is charged in a capacitor C in the integrator 730 and is output from the integrator 730 as a sensing voltage value (Vsen).

Accordingly, the analog-to-digital converter (ADC) converts the sensing voltage value (Vsen) into a digital value.

The processor 740 may calculate touch coordinates and recognize a touch force on the basis of the digital value output to the analog-to-digital converter (ADC).

According to the above description, a touch coordinate calculation and a force touch recognition may be simultaneously performed on the basis of a signal obtained through the touch driving. Accordingly, two types of sensing (the touch sensing and the touch force sensing) may be performed quickly and efficiently.

Meanwhile, when it is recognized that a touch force is generated, a predetermined application or function corresponding to the touch force may be executed.

Meanwhile, the touch circuit 120 may sense a charged amount (or voltage) according to a change in the size of a gap G between the plurality of first electrodes E1 and the second electrodes E2 to determine the size of the touch force according to the size of a sensed charged amount (or voltage).

According to the above description, not only the existence of the touch force corresponding to a force applied at the time of touching but also the size of the touch force indicating how much force is applied may be estimated.

In this regard, when the size of the touch force is estimated, a predetermined application or function may be differentiated and executed corresponding to the estimated size of the touch force.

Hereinafter, a touch system 100 according to some embodiments performs a touch driving so that a soft touch and a force touch can be distinguished from each other, thereby explaining the characteristics of a reception signal distinguished and generated at the time of the soft touch and the force touch.

Figure 8:
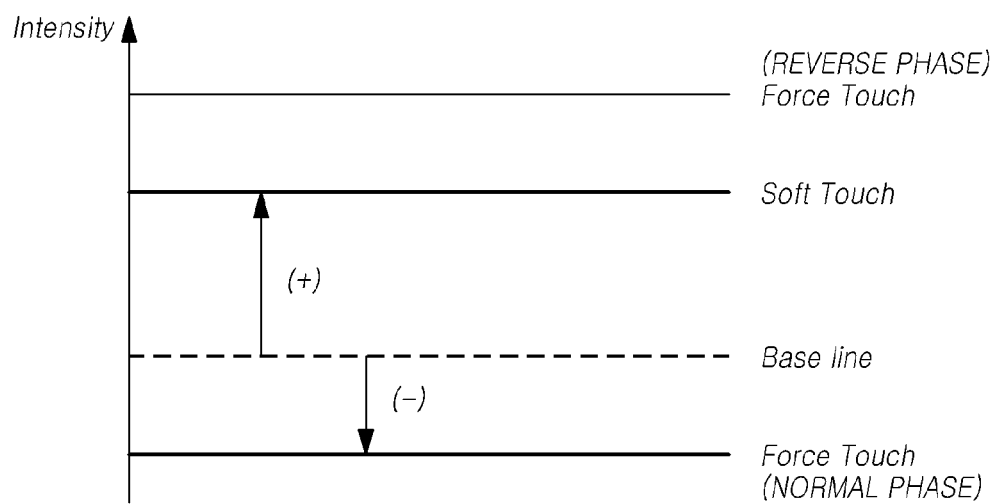
FIG. 8 illustrates a reception signal intensity according to a soft touch and a reception signal intensity according to a force touch in a touch system according to some embodiments.

FIG. 8 illustrates a reception signal intensity according to a soft touch and a reception signal intensity according to a force touch in a touch system 100 according to some embodiments.

Referring to FIG. 8, the intensity of a signal received in the first electrode E1 may be identified by a digital value output from the analog-to-digital converter (ADC).

Referring to FIGS. 8 and 9, a digital value output from the analog-to-digital converter (ADC), when a soft touch which has no pressing force or has a force of a certain level or less is generated, has a value in the positive (+) direction with reference to a digital value output from the analog-to-digital converter (ADC) when there is no touch (a base line).

As shown in FIG. 9, a peak of the size (signal intensity) of the digital value output from the analog-to-digital converter (ADC), when the soft touch is generated, occurs in a region corresponding to a position of a corresponding first electrode E1.

Referring to FIG. 8, when a second electrode driving signal DS2 and a first electrode driving signal DS1 are in a positive phase relationship, a digital value output from the analog-to-digital converter (ADC), when a force touch having a pressing force or has a force exceeding a certain level is generated, has a value in the negative (−) direction with reference to a digital value output from the analog-to-digital converter (ADC) when there is no touch (a base line).

Figure 9A:
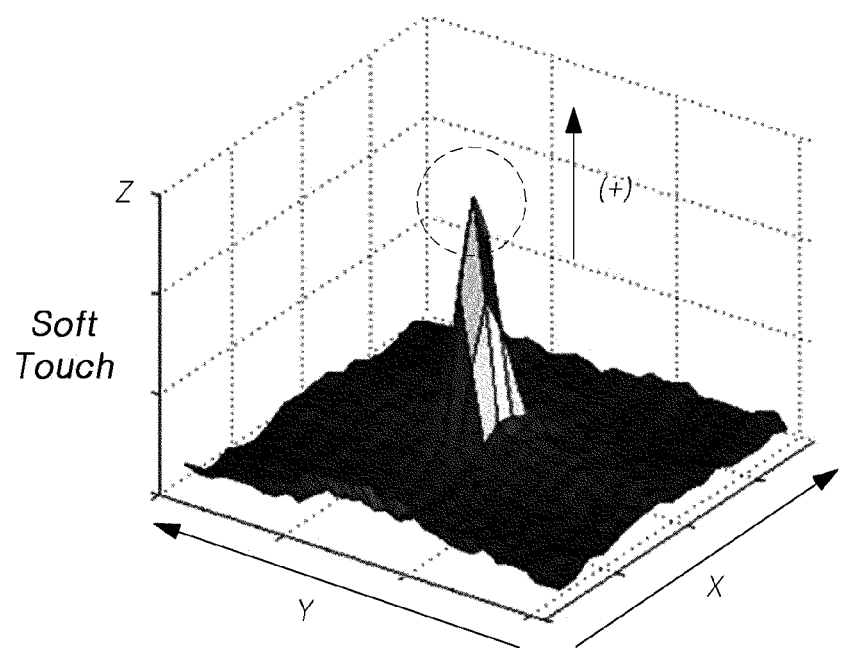
FIG. 9A and FIG. 9B illustrate reception signal intensity distributions according to a soft touch and a force touch in a touch system according to some embodiments.
Figure 9B:
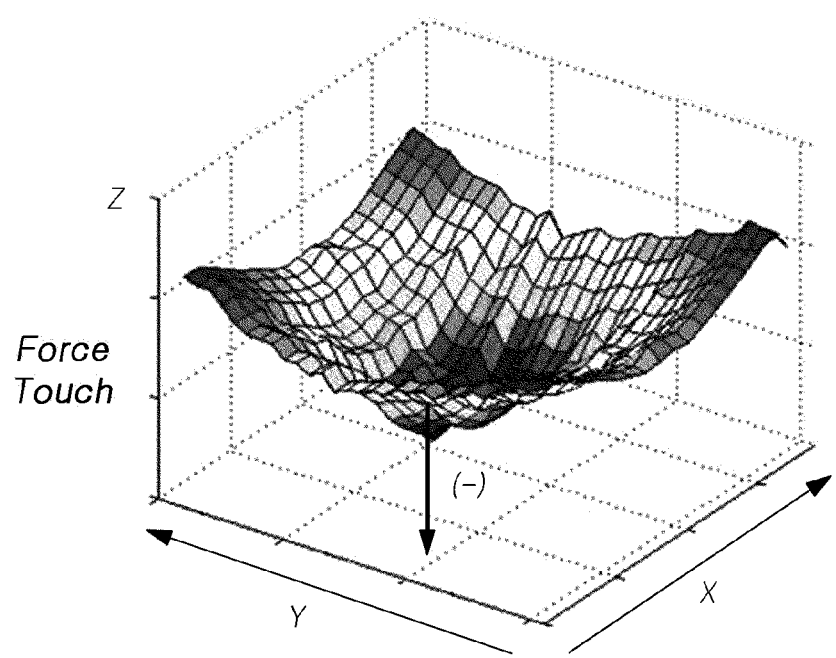

FIG. 9A illustrates a distribution of signal intensity of a reception signal when a soft touch is generated on a screen corresponding to an x-y axis plane, and FIG. 9B illustrates a distribution of signal intensity of a reception signal when a force touch is generated on a screen corresponding to an x-y axis plane.

As shown in FIG. 9A, when a soft touch is generated, the size (signal intensity) of the digital value output from the analog-to-digital converter (ADC) has a distribution in which the signal intensity generally increases in the positive (+) direction of a z axis with reference to a base line.

In addition, as shown in FIG. 9A, the signal intensity distribution when the soft touch is generated shows that a large signal intensity may be intensively distributed at a point where the soft touch is generated in the entire screen area.

As shown in 9B, when assuming that the second electrode E2 is in the entire plate form outside the display panel 110, when a force touch is generated, the size (signal intensity) of a digital value output from the analog-to-digital converter (ADC) has a distribution in which the signal intensity generally increases in the negative (−) direction of a z axis with reference to a baseline.

In addition, as shown in FIG. 9B, when a force touch is generated, the signal intensity has a distribution in which the signal intensity is largest in the central point of a screen in the negative (−) direction and gradually increases toward to the central point of the screen from the outer edge of the screen.

Meanwhile, the stronger a force touch, the greater a change in the size of a gap G between the plurality of first electrodes E1 and the second electrode E2. Accordingly, a digital value output from the analog-to-digital converter (ADC) has a larger value in the negative (−) direction of a z axis, with reference to a digital value output from the analog-to-digital converter (ADC) when there is no touch at all (a base line). That is, as the intensity of a force touch increases, the intensity of a signal increases.

Referring back to the directionality described above, a signal received from each of the plurality of first electrodes E1 when a touch is a soft touch and a signal received from each of the plurality of first electrodes E1 when a touch is a force touch may be a signal in the opposite direction with reference to a signal received from each of the plurality of first electrodes E1 when there is no touch.

That is, the signal received from each of the plurality of first electrodes E1 when a touch is a soft touch has a greater signal intensity than a base line signal obtained when there is no touch, and the signal received from each of the plurality of first electrodes E1 when a touch is a force touch has a smaller signal intensity than the base line signal.

When the second electrode driving signal DS2 and the first electrode driving signal DS1 are in a normal phase relationship, a charged amount (Q1+Q2, Q2≠0) sensed when a touch is a force touch or voltage corresponding thereto may be smaller than a charged amount (Q1+Q2=Q1, Q2=0) sensed when a touch is a soft touch or voltage corresponding thereto. Here, Q1 and Q2 may be the amount of charged charge or the amount of a change in a charged charge amount.

In addition, when the second electrode driving signal DS2 and the first electrode driving signal DS1 are in a normal phase relationship, voltage or a charged amount sensed when a touch is a force touch may be smaller than base voltage or a base charge amount sensed when there is no touch.

As described above, with reference to a signal received from each of the plurality of first electrodes E1 when there is no touch, a signal received from each of a plurality of first electrodes E1 when a touch is a soft touch is a signal in the positive (+) direction (or the negative (−) direction). A signal received from each of the plurality of first electrodes E1 when a touch is a force touch is a signal in the negative (−) direction (or the positive (+) direction). A charged amount (Q1+Q2) sensed when a touch is a force touch or voltage corresponding thereto is smaller than a charged amount Q1 sensed when a touch is a soft touch or voltage corresponding thereto (Q1+Q2<Q1). Therefore, a soft touch, which has no pressing force or has a force of a certain level or less, and a force touch which has a pressing force or has a force exceeding a certain level, can be accurately distinguished.

Referring to FIG. 8, when the second electrode driving signal DS2 and the first electrode driving signal DS1 are in a reverse phase relationship, a digital value output from the analog-to-digital converter (ADC) when a force touch having a pressing force or has a force exceeding a certain level is generated has a value in the positive (+) direction with reference to a digital value output from the analog-to-digital converter (ADC) when there is no touch at all (a base line), and has a value larger than a digital value output from the analog-to-digital converter (ADC) when a soft touch which has no pressing force or has a force of a certain level or less is generated.

When the second electrode driving signal DS2 and the first electrode driving signal DS1 are in a reverse phase relationship, a charged amount (Q1+Q2, Q2>0) or voltage sensed when a touch is a force touch may be greater than a charged amount (Q1+Q2, Q2=0) or voltage sensed when a touch is a soft touch.

By using the relationship described above, during the touch driving (the second electrode driving and the first electrode driving) being performed using the second electrode driving signal DS2 and the first electrode driving signal DS1 which are in a reverse phase relationship, the soft touch and the force touch may be efficiently distinguished from each other.

Meanwhile, the touch system 100 according to some embodiments has a unique structure for sensing a touch force. Hereinafter, a structure for sensing a touch force will be described as an example.

Figure 10:
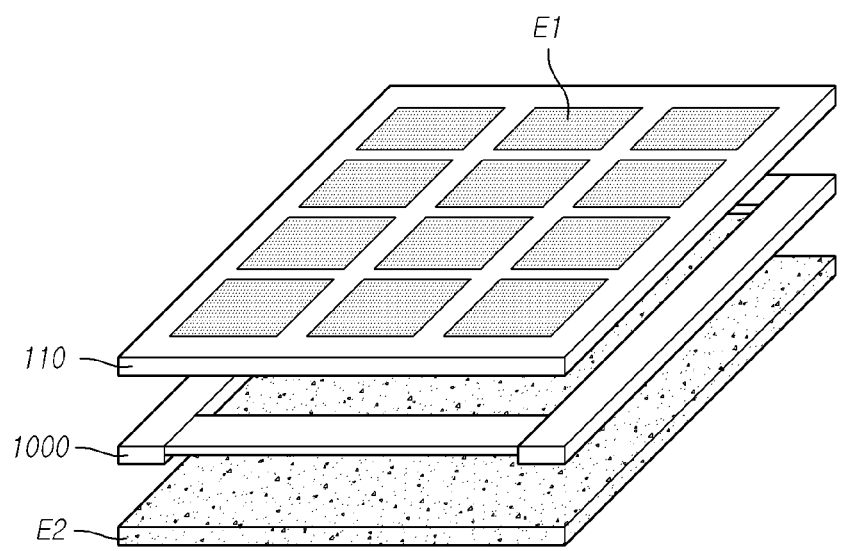
FIG. 10 simply illustrates a touch system according to some embodiments.

FIG. 10 simply illustrates a touch system 100 according to some embodiments.

Referring to FIG. 10, the touch system 100 according to some embodiments includes a plurality of first electrodes E1 arranged on a display panel 110 and a second electrode E2 disposed outside the display panel 110.

In order to sense a touch force, a gap G, the size of which can be changed according to the force touch, should be arranged between the plurality of first electrodes E1 and the second electrode E2.

Accordingly, the touch system 100 according to some embodiments may provide the gap G between the plurality of first electrodes E1 and the second electrode E2 and may include a gap structure unit 1000 which allows a change in the size of the gap G according to a touch force.

Through the gap structure unit 1000, a sensing for a touch force may be enabled.

Figure 11:
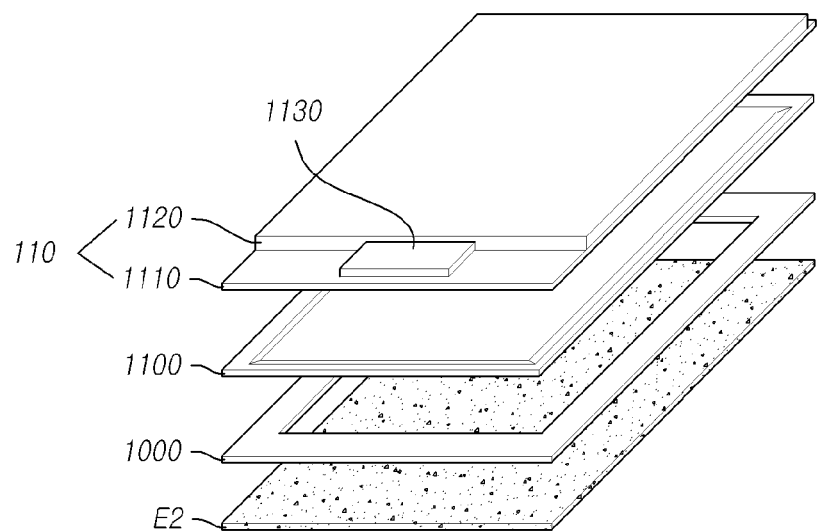
FIG. 11 illustrates a display device having a force sensor structure according to some embodiments.

FIG. 11 illustrates a display device having a force sensor structure according to some embodiments.

Referring to FIG. 11, in a display device having a force sensor structure according to some embodiments, a display panel 110 may include a first substrate 1110 on which a thin film transistor (TFT) or the like is disposed and a second substrate 1120 on which a color filter (CF) or the like is disposed.

A driving chip 1130 may be mounted, bonded, or connected to an edge portion (a non-active region) of the first substrate 1110.

Here, the driving chip 1130 may be a chip implementing a touch circuit 120 or a data driving chip, and may be a display driving chip including the touch circuit 120, a data driving circuit, and the like, according to circumstances.

Referring to FIG. 11, a lower structure 1100 may be disposed under the display panel 110.

The gap structure unit 1000 may be disposed under or inside the lower structure 1100.

The second electrode E2 may be included under or inside the gap structure unit 1000.

Accordingly, the second electrode E2 may be disposed under or inside the lower structure 1100 of the display panel 110.

As described above, the touch system may be implemented to be suitable for a design structure of the display panel 110 and the display device, by variously designing a position of the second electrode E2 or a position of the gap structure unit 1000.

Hereinafter, various types of gap structure units 1000, which can be applied in a liquid crystal display device, will be described. For convenience of explanation, for example, a display device having a force sensor structure according to the embodiments is a liquid crystal display device. Thus, positions of the first electrode E1 and the second electrode E2 included in the liquid crystal display device will be briefly described first.

Figure 12:
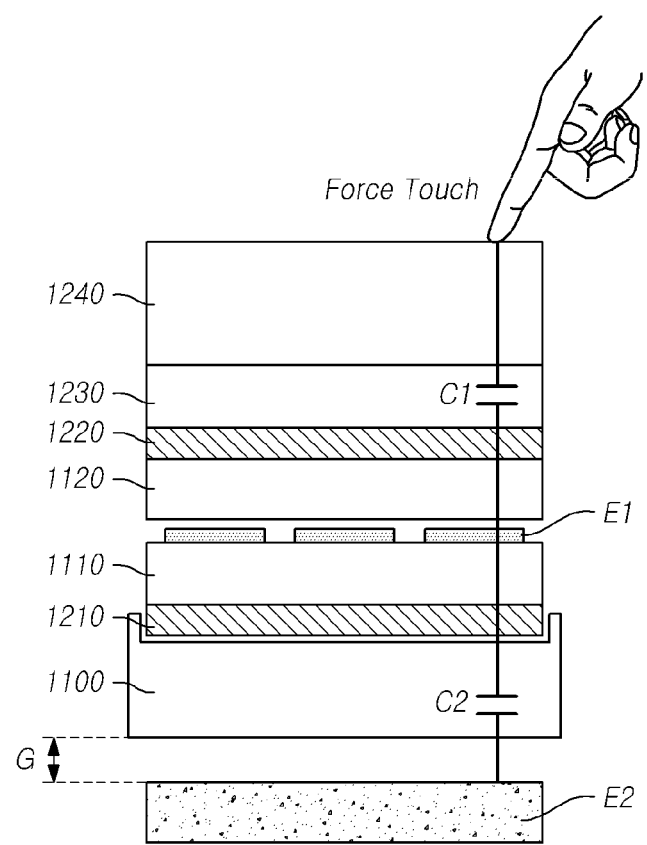
FIG. 12 is a sectional view of a display device having a force sensor structure according to some embodiments.

FIG. 12 is a sectional view of a touch system 100 of a display device having a force sensor structure according to some embodiments.

FIG. 12 illustrates positions of a plurality of first electrodes E1, a second electrode E2, and a lower structure 1100 in a case where a display device having a force sensor structure according to some embodiments is a liquid crystal display device.

Referring to FIG. 12, a display panel 110 includes a first polarizer 1210, a first substrate 1110, a plurality of first electrodes E1, a second substrate 1120, a second polarizer 1220, and the like.

A bonding layer 1230 and an upper cover 1240 are disposed on the display panel 110.

The lower structure 1100 is disposed under the display panel 110.

The lower structure 1100 may be a structure already existing in the display device or a structure separately disposed for the second electrode E2.

For example, the lower structure 1100 may be a backlight unit of a liquid crystal display device, a back cover, or the like. In addition, it is possible to be any structure that does not disturb an electric field generated by the first electrode E1 so that a capacitor can be formed between the first electrode E1 and the second electrode E2.

As described above, the touch system 100 suitable for a liquid crystal display device may be implemented by disposing the second electrode E2 under or inside the lower structure 1100 corresponding to the backlight unit.

Meanwhile, in a case of a liquid crystal display device, in order to form a second capacitance C2 between the first electrode E1 and the second electrode E2, there should not be a layer of material, such as silver (Ag), a reflecting plate, and a transparent electrode layer, between the first electrode E1 and the second electrode E2.

Figure 13:
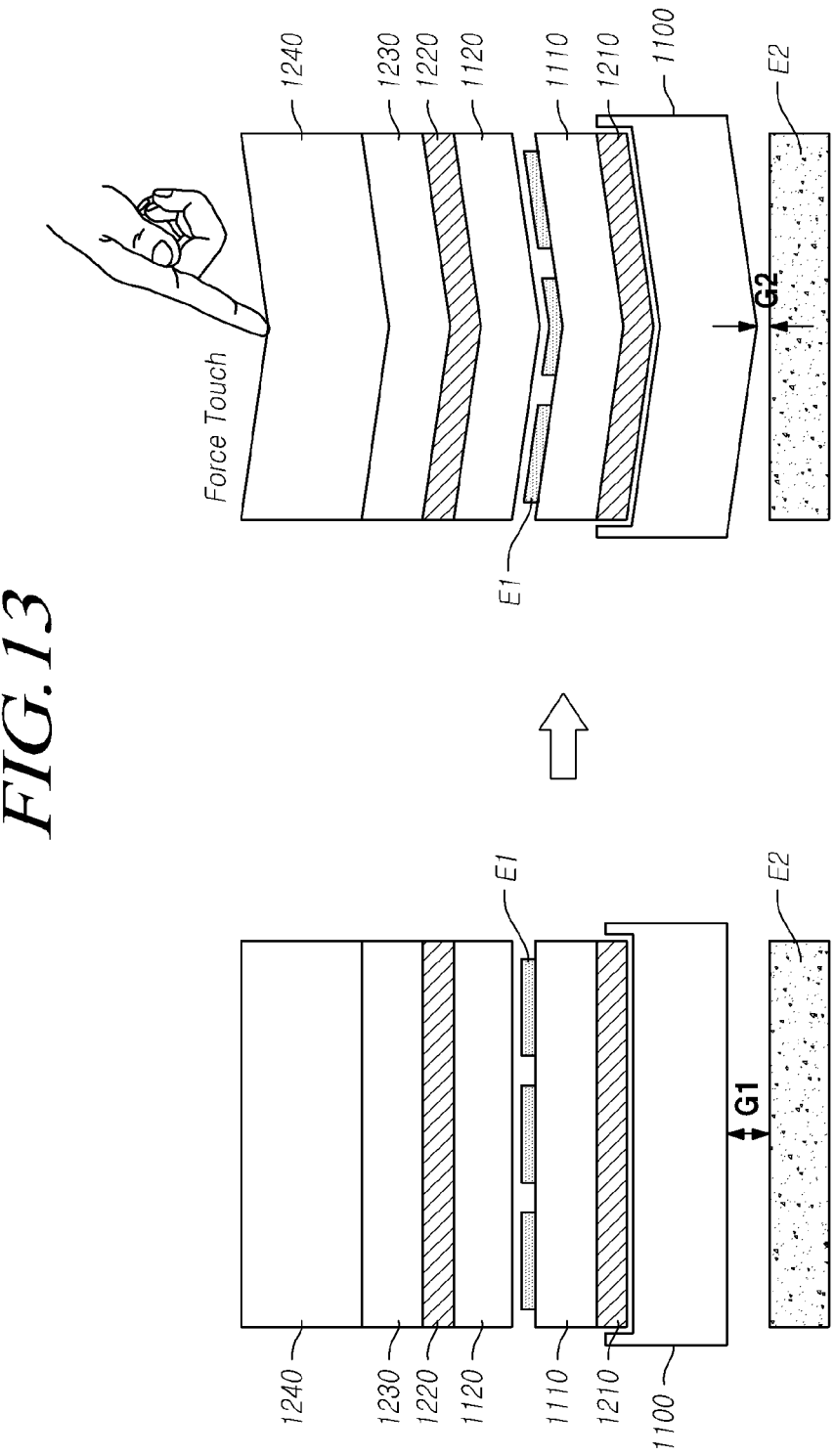
FIG. 13 illustrates a situation in which a force touch is generated in a display device having a force sensor structure so that the size of a gap is changed, according to some embodiments.

FIG. 13 illustrates a situation in which a force touch is generated in a display device having a force sensor structure so that a size of a gap G is changed, according to some embodiments.

Referring to FIG. 13, when a force touch is generated, an upper cover 1240, a display panel 110, and a lower structure 1100 is subjected to a downward force such that the lower structure 1100 and the like are slightly bent downward.

Accordingly, the size of a gap G between the lower structure 1100 and the second electrode E2 may be changed.

That is, a gap G before the force touch is generated is G1, and a gap G after the force touch is generated is G2, which is smaller than G1.

Accordingly, since a gap G is reduced from G1 to G2 before and after the force touch, the second capacitance C2 is changed and the force touch may be recognized.

The size of a gap should be changed according to a touch force in order to sense a touch force as described above, and several examples of the gap structure unit 1000 for changing the size of the gap will be described.

For example, the gap structure unit 1000 may include a base plate made of a substrate or a film, a spacer elastic pattern disposed between the edge of an upper surface of the second electrode E2 disposed on the base plate between the edge of the rear surface of the lower structure 1100, and the like.

According to a touch force, the upper cover 1240, the display panel 110, and the lower structure 1100 is subjected to a downward force.

Accordingly, a gap G between the base plates may be changed while the lower structure 1100 is bent downward.

For another example, the gap structure unit 1000 may include a base plate made of a substrate or a film, an elastic sheet disposed between the upper surface of the second electrode E2 disposed on the base plate and the rear surface of the lower structure 1100, and the like.

According to a touch force, the upper cover 1240, the display panel 110, and the lower structure 1100 is subjected to a downward force.

Accordingly, a gap G between the base plates may be changed while the lower structure 1100 is bent.

For still another example, the gap structure unit 1000 may include an upper film disposed on the rear surface of the lower structure 1100, a lower film opposite to the upper film, a bonding agent which is bonded to the edge of the rear surface of the upper film and the edge of an upper surface of the lower film, and a spacer disposed on the upper surface of the second electrode E2.

The second electrode E2 may be disposed in an inner space formed by separating a non-edge portion of the rear surface of the upper film and a non-edge portion of an upper surface of the lower film.

According to a touch force, the upper cover 1240, the display panel 110, and the lower structure 1100 is subjected to a downward force.

Accordingly, the size of a gap G between the upper surface of the second electrode E2 and the rear surface of the upper film may be changed.

For still another example, the gap structure unit 1000 may include an elastic film disposed between the upper surface of the second electrode E2 and the rear surface of the lower structure 1100, and the like.

According to a touch force, the upper cover 1240, the display panel 110, and the lower structure 1100 is subjected to a downward force.

Accordingly, since the thickness of the elastic film is changed, the size of a gap G between the upper surface of the second electrode E2 and the rear surface of the lower structure 1100 may be changed.

For still another example, the gap structure unit 1000 may include an internal pattern embedded in the lower structure 1100.

According to a touch force, the upper cover 1240, the display panel 110, and the lower structure 1100 is subjected to a downward force.

Accordingly, the inner pattern inside the lower structure 1100 is also subjected to a force, so that the size of a gap G between the upper surface of the second electrode E2 disposed on the lower portion of the lower structure 1100 and the inner pattern may be changed according to a touch force.

Figure 14:
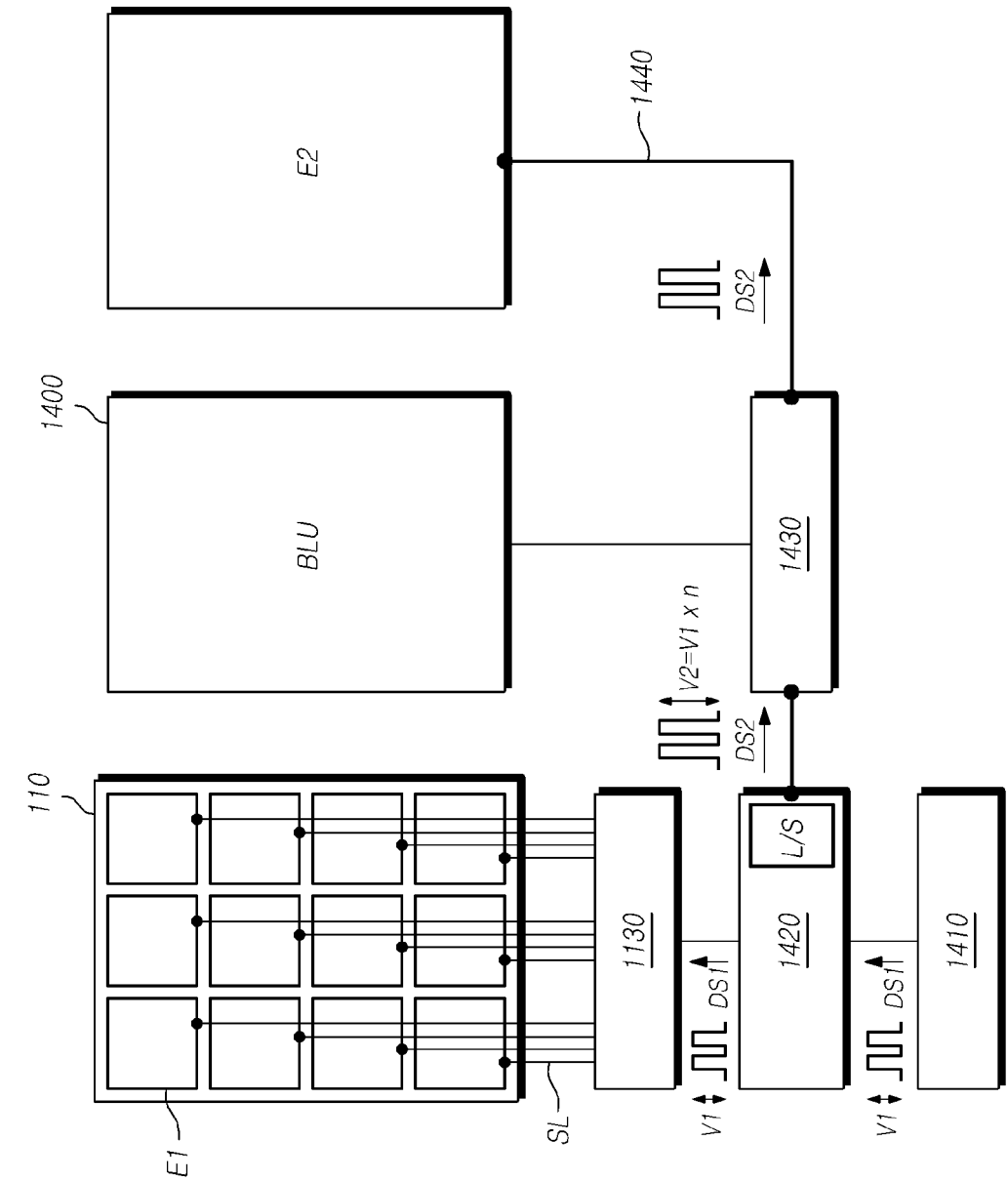
FIG. 14 and FIG. 15 illustrate a circuit for applying a driving signal in a display device having a force sensor structure according to some embodiments.
Figure 15:
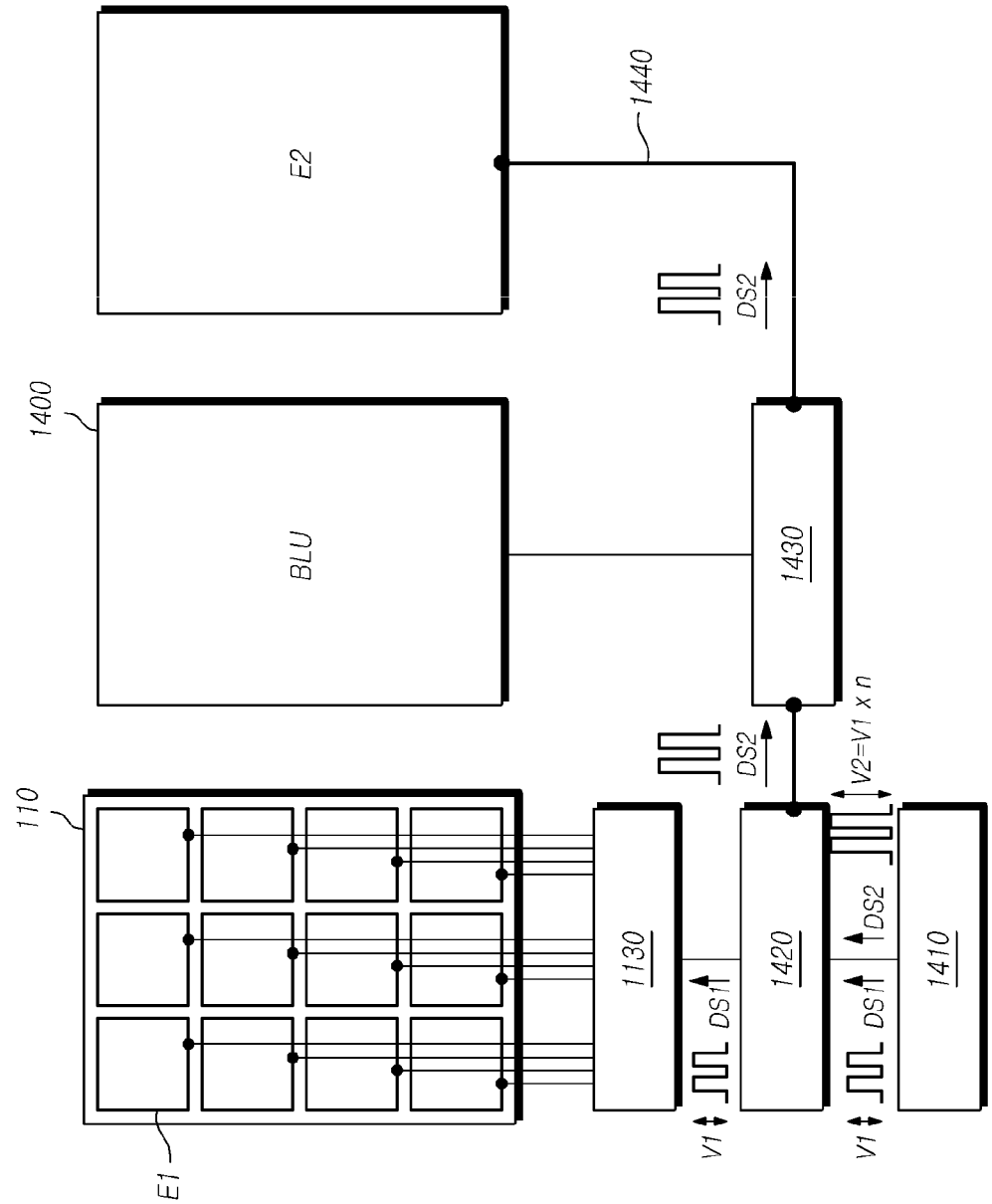

FIG. 14 and FIG. 15 illustrate a circuit for applying a driving signal in a display device having a force sensor structure according to some embodiments.

Referring to FIGS. 14 and 15, a display device having a force sensor structure may include: a display panel 110 having a plurality of first electrodes E1 built therein; a backlight unit 1400 for providing light to the display panel 110; at least one second electrode E2 disposed outside (for example, under the display panel) the display panel 110; and a touch circuit 120 which sequentially applies a first electrode driving signal DS1 to the plurality of first electrodes E1 and applies a second electrode driving signal DS2 to the second electrode E2 to sense a touch force of a touch during each touch driving.

Referring to FIG. 14 and FIG. 15, as a driving signal applying circuit corresponding to a part of the force sensor structure, the touch circuit 120 may include: a first flexible printed circuit 1420 electrically connected to the display panel 110; a second flexible printed circuit 1430, which electrically connects the backlight unit 1400 and the first flexible printed circuit 1420; and a connecting medium 1440, which electrically connects the second flexible printed circuit 1430 and the second electrode E2.

Referring to FIGS. 14 and 15, the first electrode driving signal DS1 may be sequentially applied to the plurality of first electrodes E1 embedded in the display panel 110 through the first flexible printed circuit 1420.

A driving chip 1130 may receive the first electrode driving signal DS1 from the first flexible printed circuit 1420 and output the signal to at least one signal line SL among signal lines SL connected to each of the plurality of first electrodes E1 through a multiplexer (not shown).

Accordingly, the first electrode driving signal DS1 may be applied to the plurality of first electrodes E1 embedded in the display panel 110.

Referring to FIGS. 14 and 15, the second electrode driving signal DS2 may be applied to the second electrode E2 disposed outside the display panel 110 through the first flexible printed circuit 1420, the second flexible printed circuit 1430, and the connecting medium 1440.

According to the above description, in order to perform a touch driving for sensing a touch force, a force sensor structure, which can efficiently apply the first electrode driving signal DS1 and the second electrode driving signal DS2 to the first electrode E1 and the second electrode E2, corresponding to a force sensor, may be designed by using display components in the display device as they are.

Meanwhile, the above-mentioned backlight unit 1400 may use a Light Emitting Diode (LED) as a light source element.

In this case, the first flexible printed circuit 1420 may be a panel flexible printed circuit and the second flexible printed circuit 1430 may be an LED flexible printed circuit.

As described above, when the backlight unit 1400 is an LED backlight unit, without adding a separate flexible printed circuit (FPC), the LED flexible printed circuit may be utilized as the second flexible printed circuit 1430 as it is and the panel flexible printed circuit connected to the LED flexible printed circuit may be utilized as the first flexible printed circuit 1420 as it is.

Meanwhile, the touch circuit 120 may further include a signal supply unit 1410 as shown in FIGS. 14 and 15. Here, the signal supply unit 1410 may be implemented as a Power Management (PMIC) or a Touch Power IC (TPIC).

The signal supplying unit 1410 may generate and supply both a first electrode driving signal DS1 and a second electrode driving signal DS2 or may generate and supply only a first electrode driving signal DS1.

FIG. 14 illustrates a driving signal applying circuit for generating and supplying only a first electrode driving signal DS1 by the signal supply unit 1410. FIG. 15 illustrates a driving signal applying circuit for generating and supplying both a first electrode driving signal DS1 and a second electrode driving signal DS2 by the signal supply unit 1410.

Referring to FIG. 14, the touch circuit 120 may further include a signal supply unit 1410 for outputting the first electrode driving signal DS1 to the first flexible printed circuit 1420 and may also include a level shifter (L/S) which is disposed in the first electrode drive signal 1420 and converts the amplitude of the first electrode drive signal DS1 output from the signal supply unit 1410 to output the converted first electrode driving signal DS1 as the second electrode driving signal DS2.

Referring to FIG. 14, the first electrode driving signal DS1 output from the signal supply unit 1410 is supplied to the first electrode E1 embedded in the display panel 110 through the first flexible printed circuit 1420.

Referring to FIG. 14, the first electrode driving signal DS1 input to the first flexible printed circuit 1420 is input to the level shifter L/S and the amplitude is converted so that the converted first electrode driving signal DS1 is output as a second electrode driving signal DS2.

The second electrode driving signal DS2 output from the level shifter L/S is applied to the second electrode E2 through the second flexible printed circuit 1430 and the connecting medium 1440.

The first electrode driving signal DS1 generated and output by the signal supply unit 1410 and the second electrode driving signal DS2 output from the level shifter L/S may be a pulse width modulated signal swinging between the high level voltage and the low level voltage.

As described above, in order to sense a touch force, the amplitude V2 of the second electrode driving signal DS2 should be larger than the amplitude V1 of the first electrode driving signal DS1 (V2>V1).

Therefore, the level shifter L/S converts the amplitude V1 of the first electrode driving signal DS1 into a predetermined amplitude (V2=V1*n) to output the first electrode driving signal DS1 as a second electrode driving signal DS2.

For example, the level shifter L/S may convert the amplitude by maintaining the low level voltage of the first electrode driving signal DS1 and increasing the high level voltage of the first electrode driving signal DS1.

The amplitude V2 of the second electrode driving signal DS2 output from the level shifter L/S increases to be n times (n is a real number greater than 1) of the amplitude V1 of the first electrode driving signal DS1.

According to the above description, since the signal supplying unit 1410 needs to generate and supply only the first electrode driving signal DS1, the signal generation and supply becomes easier.

Referring to FIG. 15, the touch circuit 120 may further include a signal supply unit 1410 which generates both a first electrode driving signal DS1 and a second electrode driving signal DS2 and outputs the signals to the first flexible printed circuit 1420.

The signal supply unit 1410 may set and output the amplitude V1 of the first electrode driving signal DS1 and the amplitude V2 of the second electrode driving signal DS2 so that a touch force can be sensed.

Here, the amplitude V2 of the second electrode driving signal DS2 is set to be n times (n is a real number greater than 1) of the amplitude V1 of the first electrode driving signal DS1.

The first electrode driving signal DS1 of the first electrode driving signal DS1 and the second electrode driving signal DS2 generated by the signal supplying unit 1410 and supplied to the first flexible printed circuit 1420 is applied to the first electrode E1 embedded in the display panel 110.

The second electrode driving signal DS2 of the first electrode driving signal DS1 and the second electrode driving signal DS2 generated by the signal supplying unit 1410 and supplied to the first flexible printed circuit 1420 is applied to the second electrode E2 through the second flexible printed circuit 1430 and the connecting medium 1440.

According to the above description, when the signal supplying unit 1410 generates and supplies both the first electrode driving signal DS1 and the second electrode driving signal DS2 required for sensing a touch force, there is an advantage in which the number of components required for a force sensor structure can be reduced, since additional components are not required, such as a level shifter L/S.

Figure 16:
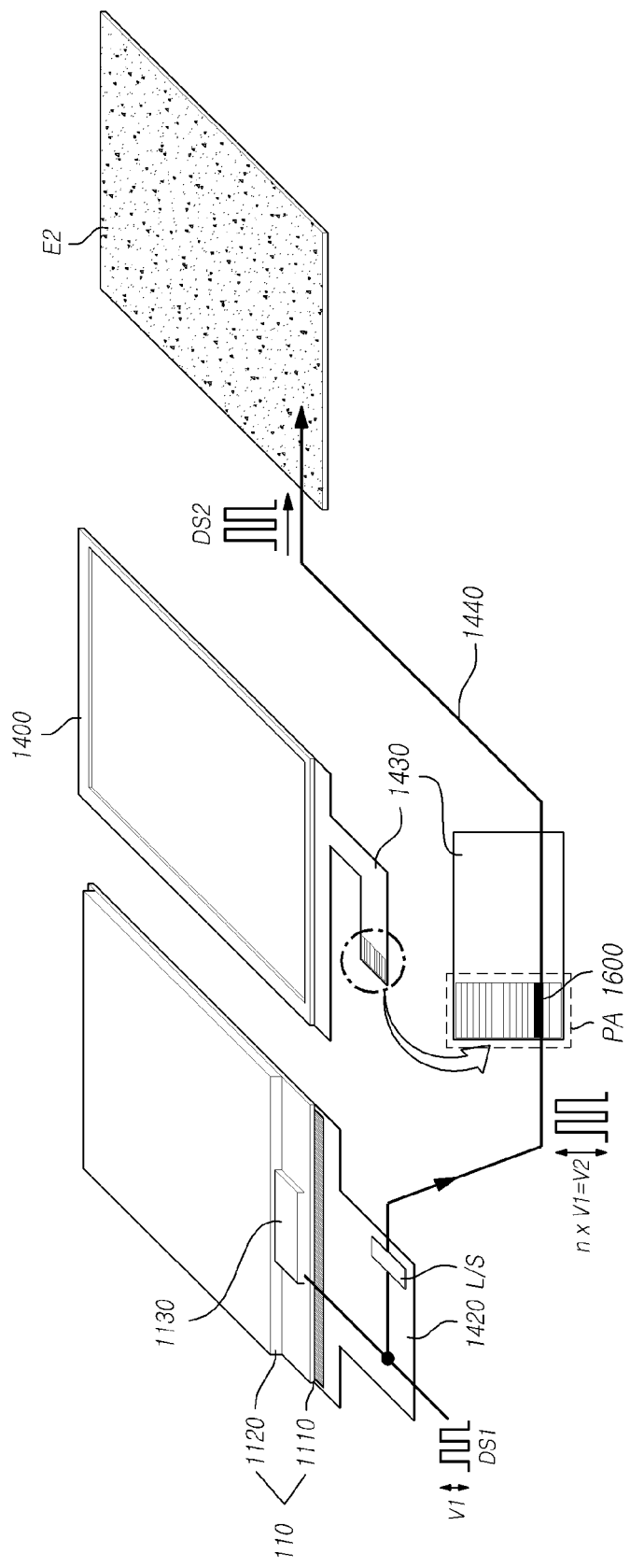
FIG. 16 is an exemplary diagram of implementation of a driving signal applying circuit in a display device having a force sensor structure according to some embodiments.

FIG. 16 is an exemplary diagram of an implementation of a driving signal applying circuit in a display device having a force sensor structure according to some embodiments. FIG. 16 is an exemplary diagram which implements FIG. 14.

Referring to FIG. 16, the first flexible printed circuit 1420 receiving an input of the first electrode driving signal DS1 output from the signal supply unit 1410 may be connected to the outer frame of the display panel 110, and may be electrically connected to the driving chip 1130.

The first flexible printed circuit 1420 and the second flexible printed circuit 1430 may be connected to each other in a pin contact scheme.

Referring to FIG. 16, the second flexible printed circuit 1430 includes a terminal portion (PA) connected to the first flexible printed circuit 1420.

In addition to a pin for receiving a signal for driving the backlight unit 140, the terminal portion (PA) of the second flexible printed circuit 1430 additionally includes a touch force sensing drive pin 1600 for receiving an input of the second electrode driving signal DS2 from the first flexible printed circuit 1420.

Through the touch force sensing drive pin 1600, the second electrode driving signal DS2 may be transmitted from the first flexible printed circuit 1420 to the second flexible printed circuit 1430.

As described above, in order to sense a touch force, and in order to transmit the second electrode driving signal DS2 required for driving the second electrode E2 from the first flexible printed circuit 1420 to the second flexible printed circuit 1430, the first flexible printed circuit 1420 and the second flexible printed circuit 1430 are connected in a pin contact scheme through a dedicated touch force sensing drive pin 1600. Therefore, the first flexible printed circuit 1420 and the second flexible printed circuit 1430 can be easily connected and an accurate signal transmission can be achieved.

Referring to FIG. 16, the second flexible printed circuit 1430 and the second electrode E2 are electrically connected through the connecting medium 1440. In the following, two examples of connecting medium 1440 will be described FIG. 17 is an exemplary diagram in which a connecting medium 1440 between a second flexible printed circuit 1430 and a second electrode E2 is implemented by a wire 1700 in a driving signal applying circuit in a display device having a force sensor structure according to some embodiments.

Figure 17:
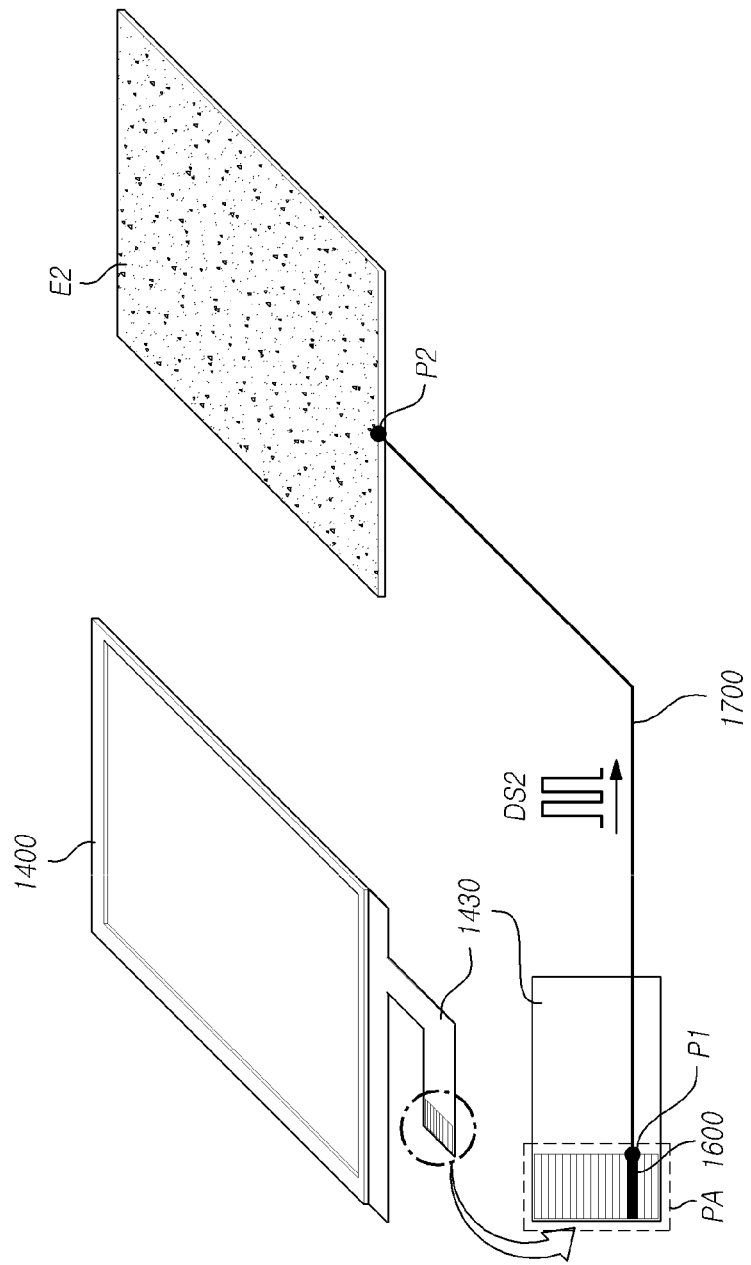
FIG. 17 is an exemplary diagram in which a connecting medium between a second flexible printed circuit and a second electrode is implemented by a wire in a driving signal applying circuit in a display device having a force sensor structure according to some embodiments.

Referring to FIG. 17, in order to transmit the second electrode driving signal DS2 from the second flexible printed circuit 1430 to the second electrode E2, the connecting medium 1440 for electrically connecting the second flexible printed circuit 1430 and second electrode E2 to each other may be implemented by the wire 1700, which directly connects the second flexible printed circuit 1430 and the second electrode E2.

Both ends P1 and P2 of the wire 1700 may be in contact with and connected to the second flexible printed circuit 1430 and the second electrode E2.

A first end P1 of both ends P1 and P2 of the wire 1700 may be connected to the touch force sensing drive pin 1600 of the second flexible printed circuit 1430 or a point electrically connected thereto.

As described above, a signal transmission between the second flexible printed circuit 1430 and the electrodes E2 may be accurately performed by directly connecting the second flexible printed circuit 1430 and the second electrode E2 using the wire 1700.

Figure 18:
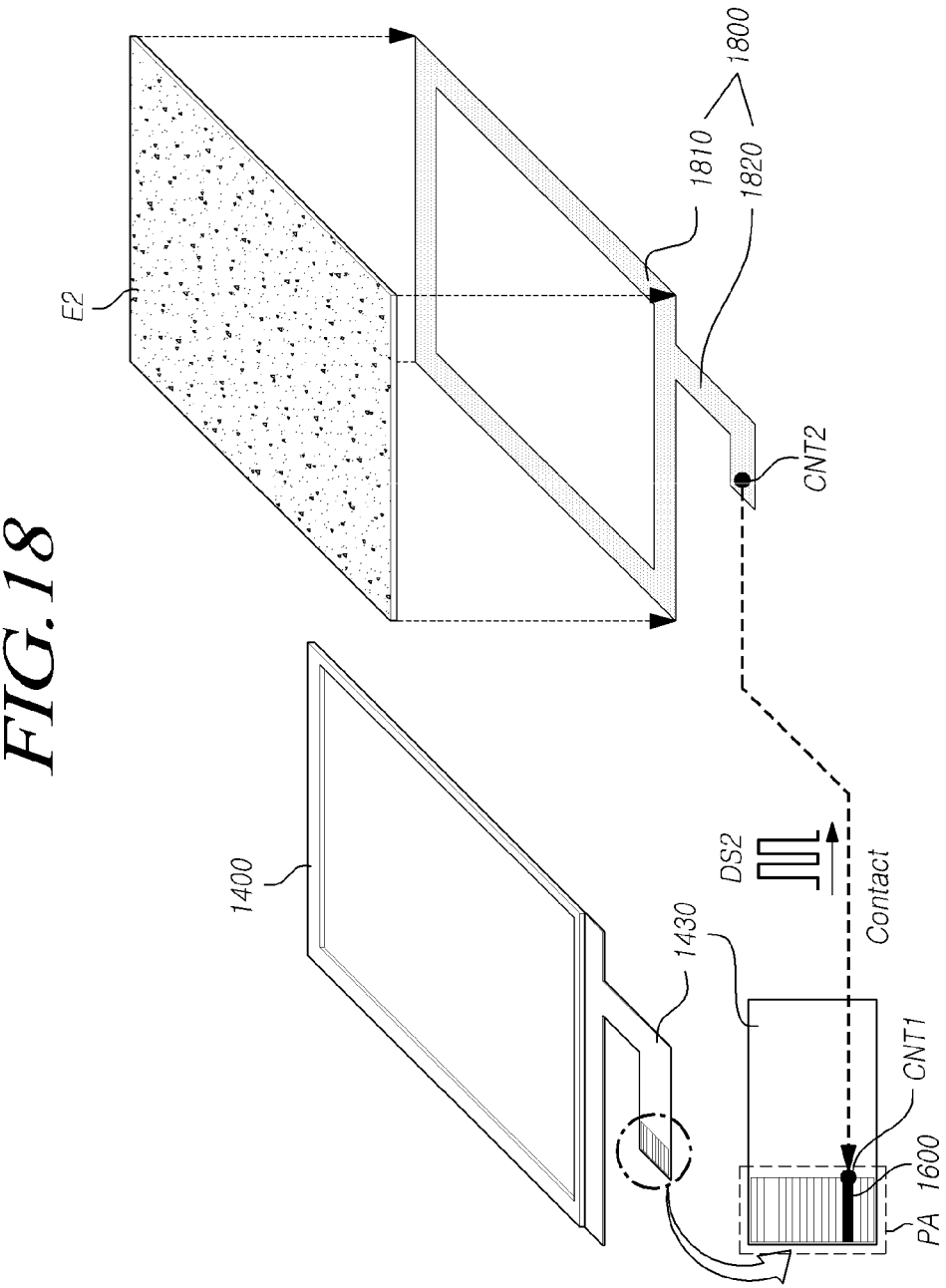
FIG. 18 is an exemplary diagram in which a connecting medium between a second flexible printed circuit and a second electrode is implemented by a conductive tape in a driving signal applying circuit in a display device having a force sensor structure according to some embodiments.

FIG. 18 is an exemplary diagram in which a connecting medium 1440 between a second flexible printed circuit 1430 and a second electrode E2 is implemented by a conductive tape 1800 in a driving signal applying circuit in a display device having a force sensor structure according to some embodiments.

Referring to FIG. 18, in order to transmit the second electrode driving signal DS2 from the second flexible printed circuit 1430 to the second electrode E2, the connecting medium 1440 for electrically connecting the second flexible printed circuit 1430 and the second electrode E2 may be implemented by the conductive tape 1800.

Referring to FIG. 18, as a connecting medium 1440 connecting the second flexible printed circuit 1430 and the second electrode E2, the conductive tape 1800 may include an electrode attachment part 1810 attached to the edge or the second electrode E2 and a connector part 1820 protruding from the second electrode attachment part 1810 to be attached to the second flexible printed circuit 1430.

The electrode attachment portion 1810 may be, for example, a frame type similar to the shape of the edge of the second electrode E2.

The connector part 1820 includes a contact part CNT2, which comes in contact with a predetermined point CNT1 on the second flexible printed circuit 1430.

The entire or a part of the conductive tape 1800 has conductivity, so that the second electrode driving signal DS2 output from the contact part CNT1 of the second flexible printed circuit 1430 may be transmitted to the second electrode E2.

The electrode attachment part 1810 in contact with the second electrode E2 in the conductive tape 1800 has a frame shape, so that a signal may be transmitted without affecting a change in capacitance associated with the second electrode E2.

The connector part 1820 in contact with the second flexible printed circuit 1430 in the conductive tape 1800 has a protruding shape suitable for a structure of the second flexible printed circuit 1430, so as to easily contact with the second flexible printed circuit 1430 in a narrow area.

Figure 19:
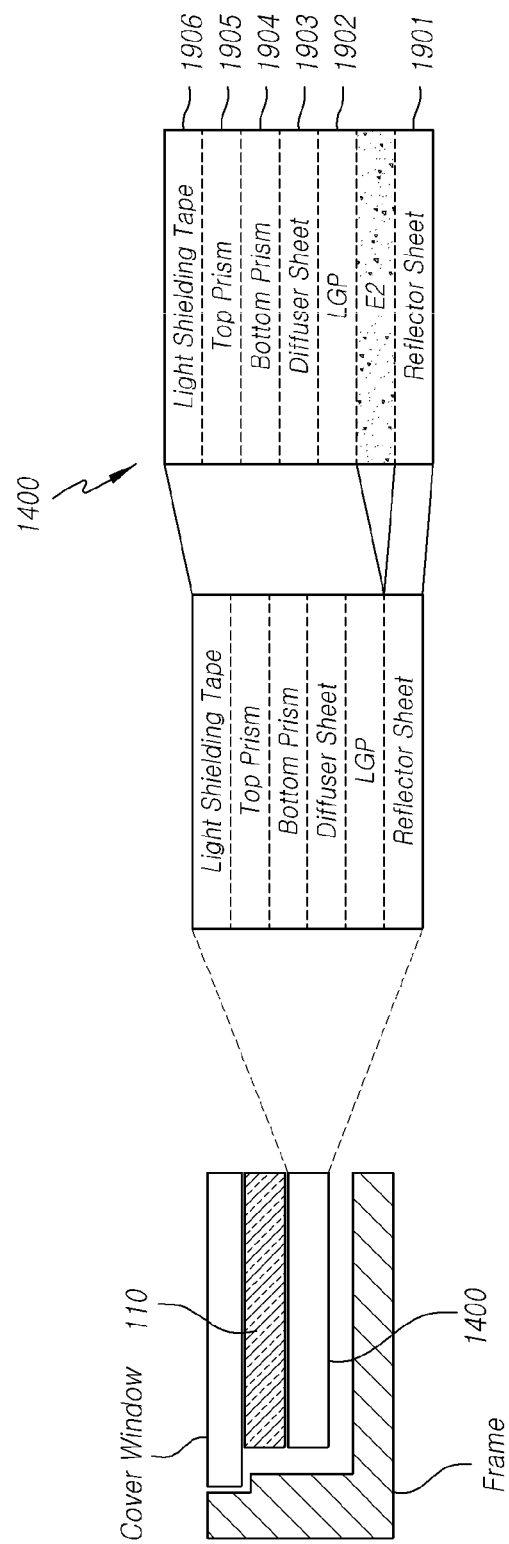
FIG. 19 and FIG. 20 are exemplary diagrams of a backlight unit having a force sensor structure partially integrated therewith in a display device having a force sensor structure according to some embodiments.
Figure 20:
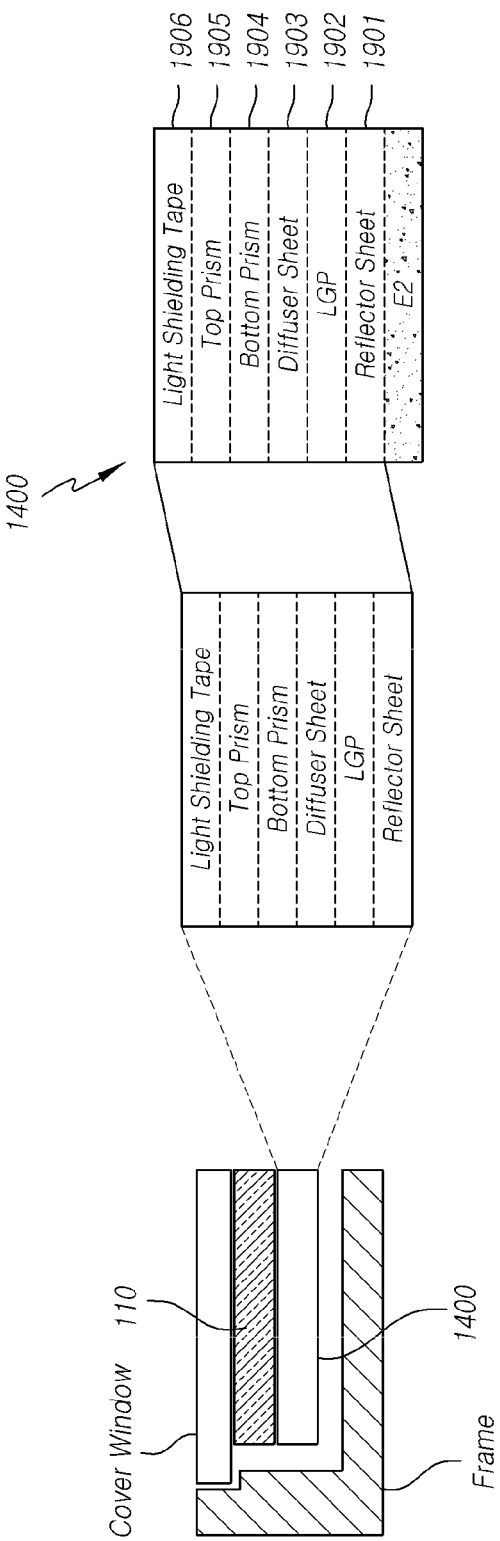

FIG. 19 and FIG. 20 are exemplary diagrams of a backlight unit 1400 having a force sensor structure partially integrated therewith in a display device having a force sensor structure according to some embodiments.

Referring to FIGS. 19 and 20, in a display device having a force sensor structure according to some embodiments, the front surface of a display panel 110 is protected by a cover window, a backlight unit 1400 corresponding to a lower structure 1100 is disposed under the display panel 110, and the cover window, the display panel 110 and the backlight unit 1400 are accommodated and protected in a frame (a case).

In a display device having a force sensor structure according to some embodiments, the backlight unit 1400 may be a backlight unit integrated with the second electrode E2.

As shown in FIG. 19, the second electrode E2 may be inserted into the backlight unit 1400 so that the backlight unit 1400 and the second electrode E2 may be integrated with each other.

Alternatively, as shown in FIG. 20, the second electrode E2 may be attached to the rear surface of the backlight unit 1400 so that the backlight unit 1400 and the second electrode E2 may be integrated with each other.

Referring to FIGS. 19 and 20, the backlight unit 1400 may include, for example, a reflection sheet 1901, a light guide panel (LGP) 1902, a diffuser sheet 1903, a bottom prism 1904, a top prism 1905, a light shielding tape 1906, and the like.

In consideration of such a backlight unit 1400, the backlight unit 1400 having a force sensor structure partially integrated therewith as illustrated in FIG. 19 may be in a form in which the second electrode E2 is inserted between the reflector sheet 1901 and the light guide plate 1902 in a type of a film or a sheet.

As illustrated in FIG. 20, the backlight unit 1400 having a force sensor structure partially integrated therewith may be in a form in which the second electrode E2 is attached to the rear surface of the light guide plate 1902.

Meanwhile, in the backlight unit 1400 having a force sensor structure partially integrated therewith, the connecting medium 1440, such as the wire 1700 or the conductive tape 1800, may be integrated as a part of the force sensor structure.

As described above, when the backlight unit 1400 having a force sensor structure partially integrated therewith is used, the force sensor structure, such as the second electrode E2, and the backlight unit 1400 do not need to be separately assembled. Therefore, assembling steps of a display device are reduced so that process time can be shortened.

Embodiments of the present invention described above may provide, in order to provide various functions in various forms, a display device having a force sensor structure which, when a user's touch occurs, senses not only touch coordinates but also the user's touch force for pressing a screen.

In addition, some embodiments may provide a display device having a force sensor structure which can utilize a reference structure.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A display device having a force sensor structure comprising:
a plurality of first electrodes embedded in a display panel, the plurality of first electrodes receiving a common voltage during a display driving section for displaying an image on the display device and receiving a first electrode driving signal during a touch driving section for sensing touch of the display panel; at least one second electrode disposed outside the display panel; a touch circuit that senses a touch force of a touch by applying both the first electrode driving signal to the plurality of the first electrodes and applying a second electrode driving signal to the second electrode during each touch driving section; a first flexible printed circuit electrically connected to the display panel; a second flexible printed circuit electrically connected the first flexible printed circuit; a connecting medium for electrically connecting the second flexible printed circuit and the second electrode; a signal supply unit for outputting the first electrode driving signal to the first flexible printed circuit, wherein the first electrode driving signal is sequentially applied to the plurality of first electrodes embedded in the display panel through the first flexible printed circuit; and a level shifter which is disposed in the first flexible printed circuit and converts an amplitude of the first electrode driving signal to output the second electrode driving signal, the second electrode driving signal applied to the second electrode disposed outside the display panel through the first flexible printed circuit, the second flexible printed circuit, and the connecting medium.

2. The device of claim 1, wherein the second flexible printed circuit comprises a terminal portion connected to the first flexible printed circuit, the terminal portion of the second flexible printed circuit comprises a touch force sensing drive pin, and the second electrode driving signal is transmitted from the first flexible printed circuit to the second flexible printed circuit through the touch force sensing drive pin.

3. The device of claim 1, wherein the connecting medium comprises a wire, both ends of the wire being connected to the second flexible printed circuit and the second electrode.

4. The device of claim 1, wherein the connecting medium comprises a conductive tape connected between the second flexible printed circuit and the second electrode.

5. The device of claim 4, wherein the conductive tape comprises:
an electrode attachment part attached to an edge of the second electrode; and
a connector part which protrudes from the second electrode attachment part to be attached to the second flexible printed circuit, and comes in contact with a predetermined point on the second flexible printed circuit.

6. The device of claim 1, further comprising
a backlight unit disposed under the display panel, wherein the second flexible printed circuit comprises a light emitting diode flexible printed circuit for electrically connecting the backlight unit and the first flexible printed circuit.

7. The device of claim 6, wherein the second electrode is inserted into the backlight unit.

8. The device of claim 6, wherein the second electrode is attached to the rear surface of the backlight unit.

9. The device of claim 1, wherein the second electrode driving signal and the first electrode driving signal have the same phase.

10. The device of claim 1, wherein the second electrode driving signal have a greater signal intensity than the first electrode driving signal.

11. The device of claim 1, wherein a gap, the size of which can be changed according to the touch force, exists between the plurality of first electrodes and the second electrode.

12. The device of claim 11, wherein, during the touch driving, the touch circuit sequentially applies the first electrode driving signal to the plurality of first electrodes, applies the second electrode driving signal to the second electrode, and senses voltage or a charged amount according to a change in the size of a gap between the plurality of first electrodes and the second electrode, on the basis of a signal received from each of the plurality of first electrodes, so as to recognize the touch force.

13. The device of claim 12, wherein the touch circuit senses voltage or a charged amount according to a change in the size of a gap between the plurality of first electrodes and the second electrode to determine the size of the touch force according to a size of a sensed charged amount or voltage.

14. The device of claim 12, wherein the touch circuit uses a signal received from each of the plurality of first electrodes to recognize the touch force and calculate coordinates of the touch.

15. The device of claim 12, wherein one end of the connecting medium is connected to the second flexible printed circuit and the other end of the connecting medium is connected to the second electrode, wherein the second flexible printed circuit does not overlap with the second electrode in a plan view in at least one portion between the one end and the other end of the connecting medium.

* * * * *